(12) United States Patent
Du et al.

(10) Patent No.: US 12,423,153 B2
(45) Date of Patent: Sep. 23, 2025

(54) DATA SHARING SYSTEM AND DATA SHARING METHOD THEREFOR

(71) Applicant: Shanghai Cambricon Information Technology Co., Ltd, Pudong New Area (CN)

(72) Inventors: Zidong Du, Pudong New Area (CN); Shaoli Liu, Pudong New Area (CN); Zai Wang, Pudong New Area (CN); Tianshi Chen, Pudong New Area (CN); Shuai Hu, Pudong New Area (CN); Xuda Zhou, Pudong New Area (CN)

(73) Assignee: SHANGHAI CAMBRICON INFORMATION TECHNOLOGY CO., LTD., Pudong New Area (CN)

( * ) Notice: Subject to any disclaimer, the term of this patent is extended or adjusted under 35 U.S.C. 154(b) by 1371 days.

(21) Appl. No.: 16/694,124

(22) Filed: Nov. 25, 2019

(65) Prior Publication Data

US 2020/0089535 A1 Mar. 19, 2020

Related U.S. Application Data

(63) Continuation of application No. 16/693,918, filed on Nov. 25, 2019, now Pat. No. 10,901,815, which is a
(Continued)

(30) Foreign Application Priority Data

May 16, 2018 (CN) .......................... 201810467383.1

(51) Int. Cl.
*G06F 9/50* (2006.01)
*G01N 30/86* (2006.01)
(Continued)

(52) U.S. Cl.
CPC ......... *G06F 9/505* (2013.01); *G01N 30/8644* (2013.01); *G06F 1/329* (2013.01);
(Continued)

(58) Field of Classification Search
CPC ........... G06F 9/505; G06N 3/02; G06N 3/063
See application file for complete search history.

(56) References Cited

U.S. PATENT DOCUMENTS 8,402,463 B2 * 3/2013 Norton ................ G06F 11/3419
712/216
8,635,412 B1 1/2014 Wilshire
(Continued)

FOREIGN PATENT DOCUMENTS

CN 1200513 A 12/1998
CN 1522402 A 8/2004
(Continued)

OTHER PUBLICATIONS

Yao, Xuanxia, Peng Geng, and Xiaojiang Du. "A task scheduling algorithm for multi-core processors." 2013 International Conference on Parallel and Distributed Computing, Applications and Technologies. IEEE, 2013. (Year: 2013).*
(Continued)

*Primary Examiner* — Benjamin P Geib
(74) *Attorney, Agent, or Firm* — Getech Law LLC; Jun Ye

(57) ABSTRACT

The application provides a processor and processing method. The processor includes a task segmentation device configured to perform task segmentation according to a task segmentation granularity and a hardware resource division device configured to divide hardware resources of the processor according to a task segmentation result. The processor and processing method provided by the application improve the processing performance and reduce the over-
(Continued)

head by performing task segmentation and configuring different hardware according to task segmentation.

15 Claims, 7 Drawing Sheets

Related U.S. Application Data continuation-in-part of application No. PCT/CN2018/092829, filed on Jun. 26, 2018.

(51) Int. Cl.
- *G06F 1/329* (2019.01)
- *G06N 3/02* (2006.01)
- *G06N 3/04* (2023.01)
- *G06N 3/063* (2023.01)
- *G06N 5/01* (2023.01)

(52) U.S. Cl.
CPC .......... *G06F 9/5038* (2013.01); *G06F 9/5061* (2013.01); *G06F 9/5066* (2013.01); *G06N 3/02* (2013.01); *G06N 3/04* (2013.01); *G06N 5/01* (2023.01); *G06F 2209/5017* (2013.01)

(56) References Cited

U.S. PATENT DOCUMENTS

| | | | |
|---|---|---|---|
| 2005/0251639 | A1 | 11/2005 | Vishin et al. |
| 2007/0226718 | A1 | 9/2007 | Watanabe |
| 2009/0265500 | A1 | 10/2009 | Kyusojin |
| 2010/0125717 | A1 | 5/2010 | Navon |
| 2012/0131283 | A1 | 5/2012 | Mital et al. |
| 2016/0103743 | A1 | 4/2016 | Sanghi et al. |
| 2016/0179434 | A1 | 6/2016 | Herrero Abellanas et al. |
| 2016/0217198 | A1 | 7/2016 | Lee et al. |
| 2016/0335127 | A1* | 11/2016 | Artmeier ............... G06F 9/5044 |
| 2017/0169812 | A1 | 6/2017 | Lample et al. |
| 2018/0300616 | A1* | 10/2018 | Ambardekar ........... H04L 45/04 |

FOREIGN PATENT DOCUMENTS

| | | |
|---|---|---|
| CN | 1588425 A | 3/2005 |
| CN | 1702858 A | 11/2005 |
| CN | 101013410 A | 8/2007 |
| CN | 101246466 A | 8/2008 |
| CN | 101739867 A | 6/2010 |
| CN | 101980149 A | 2/2011 |
| CN | 102184157 A | 9/2011 |
| CN | 102741828 A | 10/2012 |
| CN | 102831011 A | 12/2012 |
| CN | 102866912 A | 1/2013 |
| CN | 102930866 A | 2/2013 |
| CN | 103019656 A | 4/2013 |
| CN | 103177733 A | 6/2013 |
| CN | 103347037 A | 10/2013 |
| CN | 103530600 A | 1/2014 |
| CN | 103928023 A | 7/2014 |
| CN | 104021042 A | 9/2014 |
| CN | 104268603 A | 1/2015 |
| CN | 104281540 A | 1/2015 |
| CN | 104463101 A | 3/2015 |
| CN | 104464423 A | 3/2015 |
| CN | 104978971 A | 10/2015 |
| CN | 105159762 A | 12/2015 |
| CN | 105512723 A | 4/2016 |
| CN | 105678253 A | 6/2016 |
| CN | 105793830 A | 7/2016 |
| CN | 106056212 A | 10/2016 |
| CN | 106062786 A | 10/2016 |
| CN | 106407145 A | 2/2017 |
| CN | 106502806 A | 3/2017 |
| CN | 106682702 A | 5/2017 |
| CN | 106781784 A | 5/2017 |
| CN | 106897248 A | 6/2017 |
| CN | 106909971 A | 6/2017 |
| CN | 107590531 A | 1/2018 |
| CN | 107832768 A | 3/2018 |
| CN | 107992329 A | 5/2018 |
| WO | 2015042904 A1 | 4/2015 |

OTHER PUBLICATIONS

CN 201710515517.8—Notification to Grant Patent Right for Invention, mailed on Nov. 1, 2022, 5 pages.
Communication pursuant to Article 94(3) EPC mailed on Feb. 28, 2023, 7 pages.
CN201710515517.8—Office Action, mailed Feb. 23, 2022, 23 pages, (with English translation).
CN201810467383.1—Office Action, mailed Aug. 27, 2021, 21 pages, (with English translation).
CN201810641721.9—Office Action, mailed Oct. 9, 2021, 13 pages, (with English translation).
Goodfellow et al., "Generative Adversarial Nets", Jun. 10, 2014, 9 pages.
EP18824582.3, Response to Extended European Search Report dated Aug. 20, 2020, mailed Feb. 18, 2021, 13 pages.
EP18824582.3, Response to the Invitation to File Search Results Pursuant to Rule 70b(1) EPC dated Mar. 1, 2021, filed Mar. 4, 2021, 16 pages.
Li Hong, The application of BP Neural Network in Image Correcting Work Based on Matlab Platform, Journal of Langfang Teachers College (Natural Science Edition), vol. 15 No. 1, Feb. 2015, 4 pages.
Yu Zijian, et al., "FPGA-Based Accelerator for Convolutional Neural Network", Computer Engineering, 2017, 7 pages.
Shijin Zhang, et. al., "Cambricon-X: An Accelerator for Sparse Neural Networks", IEEE, 2016, 12 pages.
Shaoli Liu, et al., "Cambricon: An Instruction Set Architecture for Neural Networks", ACM/IEEE, 2016, 13 pages.
Shun-Wen Cheng, "Configurable CMOS H-tree Logic Module", Dept. of Electronic Engineering, Far East University, IEEE, 2009, 4 pages.
PCT/CN2018092829, EP18824582.3, Extended European Search Report, mailed Aug. 3, 2020, 9 pages.
PCT/CN2018/092829—International Search report and Written Opinion mailed on Sep. 17, 2018, 14 pages.
CN202110668344—First Office Action mailed on Jul. 4, 2024, 13 pages.
CN201710497394.X—Third Office Action mailed on Apr. 3, 2024, 12 pages.
CN202110668344.X—Second Office Action mailed on Dec. 11, 2024, 16 pages.
CN202110668344.X—Rejection Decision mailed on Feb. 12, 2025, 13 pages.

* cited by examiner

DATA SHARING SYSTEM AND DATA SHARING METHOD THEREFOR

TECHNICAL FIELD

The disclosure relates to the field of information processing, and particularly to a processor and a processing method.

BACKGROUND

Neural network algorithm has become the most advanced algorithm in many fields, such as image recognition, speech recognition, and natural language processing, where deep learning algorithm is the most important. These neural networks perform different operations through neurons in different layers to process the input data and finally obtain the corresponding output. In general, processing different input samples will get different output results through the same neural network, that is, a fixed neural network completes the mapping of one input to one output. However, for many scenarios, there are multiple input samples at the same time, and these inputs need to be completed quickly, that is, there are multi-service request. At the same time, batch processing is usually adopted in the training process, that is, the weights are updated after the computation of multiple samples (that is, the size of the batch) is completed, and multiple input samples (including forward and reverse) need to be computed simultaneously.

In the process of implementing the present application, the applicant found that the above existing technology has the following technical defects: the neural network device cannot support simultaneous computation of multiple input samples, that is, it cannot support batch training and multi-service requests.

Moreover, with the increasing scale of neural network, multi-core neural network processor has gradually replaced single-core neural network processor. However, when the traditional task scheduling method is applied to the multi-core neural network processor, there are some problems such as low service quality, low kernel utilization rate, unbalanced load and large energy consumption. Therefore, how to perform task segmentation and task scheduling on neural network for multi-core neural network processor becomes an urgent problem to be solved.

SUMMARY

The disclosure provides a processor and a processing method, so as to solve the above technical problems.

According to an aspect of the disclosure, a processor is provided. The processor may include a task segmentation device 100 configured to segment a task into multiple subtasks according to a task segmentation granularity; and a hardware resource division device configured to divide hardware resources of the processor respectively for the multiple subtasks.

In some embodiment, the processor may further include multiple processing elements. The hardware resource division device may be configured to divide the multiple processing elements of the processor into multiple computation groups respectively for the multiple subtasks.

In some embodiment, the hardware resource division device is configured to dynamically adjust the multiple computation groups of the processing elements.

In some embodiment, the task segmentation device 100 includes a task segmentation granularity selection unit 20 configured to determine the task segmentation granularity.

In some embodiment, the granularity task segmentation unit 10 includes at least one of the following units: a first granularity task segmentation unit 11 configured to take the whole task as one of the subtasks; a second granularity task segmentation unit 12 configured to divide sample data associated with the task into one or more subset of sample data, and identify a computation of each subset of sample data as one of the subtasks; a third granularity task segmentation unit 13 configured to segment the task according to layer types of a neural network, where computation for layers of the same layer type is identified as one of the subtasks; fourth granularity task segmentation unit 14 configured to segment the task according to an interlayer structure of the neural network, wherein computation for multiple adjacent layers is identified as one of the subtasks; and a fifth granularity task segmentation unit 15 configured to segment the task according to intra-layer structures of the neural network to segment computation types in each of the layers of the neural network into subtasks.

In some embodiment, the task segmentation granularity selection unit 20 is configured to select at least one of the first to fifth granularity task segmentation units for task segmentation on the basis of at least one of the number of samples to be processed of the neural network, a topological structure of the neural network and a computation amount of each layer.

In some embodiment, the processor may further include a task scheduling device 300 that includes: a task queue unit 30 configured to cache unscheduled tasks; a monitoring unit 40 configured to monitor the working state of each of multiple cores in the processor in real time; and a task scheduling unit 50 configured to select a task to be scheduled from the unscheduled tasks, and allocate and schedule the task to be scheduled to a target core according to the working state of each of the multiple cores.

In some embodiment, the task scheduling unit 50 is configured to allocate and schedule the task to be scheduled to the target core in at least one of the following manners: counting the number of tasks in a private task queue of each core and selecting the core with the fewest tasks in the private task queue as the target core; tracking time for completion of all the tasks in the private task queue of each core and selecting the core of which the task completion time is shortest as the target core; monitoring a distribution condition of resources required by the task to be scheduled in all the cores and selecting the core with the most resources as the target core; allocating the task to be scheduled to the target core by adopting a heuristic algorithm.

The disclosure may further include a processing method. The method may include segmenting, by a task segmentation device 100, a task into multiple subtasks according to a task segmentation granularity; and dividing, by a hardware resource division device, hardware resources of a processor respectively for the multiple subtasks.

The method may further include dividing, by the hardware resource division device, multiple processing elements of the processor into multiple computation groups respectively for the multiple subtasks.

The method may further include dynamically adjusting, by the hardware resource division device, the multiple computation groups of the processing elements.

The method may further include determining, by the task segmentation granularity selection unit 20, the task segmentation granularity.

The method may further include selecting, by the task segmentation granularity selection unit 20, at least one of multiple granularity task segmentation units based on at least one of an amount of sample data to be processed in a neural network, a topological structure of the neural network, and a computation amount of each layer.

The method may further include allocating and scheduling the task after task segmentation, wherein allocating and scheduling the task after the task segmentation includes: caching unscheduled tasks; monitoring the working state of each core of the processor in real time; and selecting a task to be scheduled from the unscheduled tasks, and allocating and scheduling the task to be scheduled to a target core according to the working state of each core.

The method may further include allocating and scheduling the task to be scheduled to the target core includes counting a number of tasks in a private task queue of each core and selecting the core with the fewest tasks in the private task queue as the target core.

The method may further include tracking time for completion of all the tasks in the private task queue of each core and selecting the core of which the task completion time is shortest as the target core.

The method may further include monitoring a distribution condition of resources required by the task to be scheduled in all the cores and selecting the core with the most resources as the target core.

The method may further include allocating the task to be scheduled to the target core by adopting a heuristic algorithm.

In some embodiments, the processor may further include multiple Processing Elements (PEs), and the hardware resource division device may be configured to divide the multiple PEs of the processor according to the task segmentation result, for example, dividing the multiple PEs into multiple computation groups according to the task segmentation result so as to compute different forward and reverse paths in a batch or run different service requests respectively.

In some embodiments, the processor may dynamically regulate grouping of the multiple PEs according to the task segmentation result in the running process.

In some embodiments, the task segmentation device 100 may include a task segmentation granularity selection unit 20 and a granularity task segmentation unit 10.

The task segmentation granularity selection unit 20 may be configured to select the granularity to be adopted. The granularity task segmentation unit 10 may be configured to segment a task by adopting at least one granularity to form subtasks.

In some embodiments, the granularity task segmentation unit 10 may include at least one of a first granularity task segmentation unit 11, a second granularity task segmentation unit 12, a third granularity task segmentation unit 13, a fourth granularity task segmentation unit 14, and a fifth granularity task segmentation unit 15.

The first granularity task segmentation unit 11 may be configured to take the whole task as a subtask.

The second granularity task segmentation unit 12 may be configured to segment the task by selecting part of sample computation in the task as a subtask.

The third granularity task segmentation unit 13 may be configured to perform task segmentation according to layer types of a neural network, in which computation for layers of the same type may be taken as a subtask.

The fourth granularity task segmentation unit 14 may be configured to perform task segmentation according to an interlayer structure of the neural network, in which computation for multiple adjacent layers may be taken as a subtask.

The fifth granularity task segmentation unit 15 may be configured to perform task segmentation according to intralayer structures of the neural network to segment computation in the layers of the neural network into subtasks.

In some embodiments, the task segmentation granularity selection unit 20 may select at least one of the first to fifth granularity task segmentation units for task segmentation on the basis of at least one of the count of samples to be processed of the neural network, a topological structure of the neural network and a computation amount of each layer.

In some embodiments, the processor may further include a task scheduling device 300. The processor is a multi-core processor, and the task scheduling device 300 may include a task queue unit 30, a monitoring unit 40, and a task scheduling unit 50.

The task queue unit 30 may be configured to cache unscheduled tasks.

The monitoring unit 40 may be configured to monitor the working state of each core in real time.

The task scheduling unit 50 may be configured to select a task to be scheduled from the unscheduled tasks and allocate and schedule the task to be scheduled to a target core according to the working state of each core.

In some embodiments, the task scheduling unit 50 may be configured to allocate and schedule the task to be scheduled to the target core in at least one of the following manners.

The task scheduling unit 50 may be configured to make statistics on the count of tasks in a private task queue of each core and to select the core with the fewest tasks in the private task queue as the target core.

The task scheduling unit 50 may be configured to make statistics on time for completion of all the tasks in the private task queue of each core and to select the core of which the task completion time is shortest as the target core.

The task scheduling unit 50 may be configured to make statistics on a distribution condition of resources required by the task to be scheduled in all the cores and to select the core with the most resources as the target core.

The task scheduling unit 50 may be configured to allocate the task to be scheduled to the target core by adopting a heuristic algorithm.

According to another aspect of the disclosure, a combined processing device is provided. The combined processing device may include a processor, and interact with another processing device through an interconnection interface to complete a computation operation specified by a user together.

According to another aspect of the disclosure, a neural network chip is provided, and the neural network chip may include a processor or the combined processing device.

According to another aspect of the disclosure, an electronic equipment is provided, and the electronic equipment may include the neural network chip.

According to another aspect of the disclosure, a processing method is provided, which may include the follows.

A task segmentation device 100 may perform task segmentation according to a task segmentation granularity.

A hardware resource division device may divide hardware resources of a processor according to a task segmentation result.

In some embodiments, in the step that the hardware resource division device divides the hardware resources of the processor according to the task segmentation result, the hardware resource division device may divide multiple PEs of the processor according to the task segmentation result, for example, the hardware resource may divide the multiple PEs into multiple computation groups according to the task segmentation result to compute different forward and reverse paths in a batch or run different service requests respectively.

In some embodiments, the processor may dynamically regulate grouping of the multiple PEs according to the task segmentation result in a running process.

In some embodiments, the step that the task segmentation device 100 performs task segmentation according to the task segmentation granularity may include the follows.

The task segmentation granularity selection unit 20 may select the granularity to be adopted.

The granularity task segmentation unit 10 may segment a task of each divided hardware resource by adopting at least one granularity to form subtasks.

In some embodiments, the task segmentation granularity selection unit 20 may select at least one of multiple granularity task segmentation units for task segmentation on the basis of at least one of the count of samples to be processed of a neural network, a topological structure of the neural network and a computation amount of each layer.

In some embodiments, the processing method may further include allocating and scheduling the task after task segmentation, and the processing method may include the followings:

caching unscheduled tasks;

monitoring the working state of each core of the processor in real time; and selecting a task to be scheduled from the unscheduled tasks, and allocating and scheduling the task to be scheduled to a target core according to the working state of each core.

In some embodiments, allocating and scheduling the task to be scheduled to the target core may be in at least one of the following manners:

making statistics on the count of tasks in a private task queue of each core and selecting the core with the fewest tasks in the private task queue as the target core;

making statistics on time for completion of all the tasks in the private task queue of each core and selecting the core of which the task completion time is shortest as the target core;

making statistics on a distribution condition of resources required by the task to be scheduled in all the cores and selecting the core with the most resources as the target core.

The task to be scheduled is allocated to the target core by adopting a heuristic algorithm.

DETAILED DESCRIPTION OF THE EMBODIMENTS

In order to make the purpose, technical solutions and advantages of the disclosure clearer, the disclosure will further be described below in combination with specific embodiments and with reference to the drawings in detail.

Figure 1:
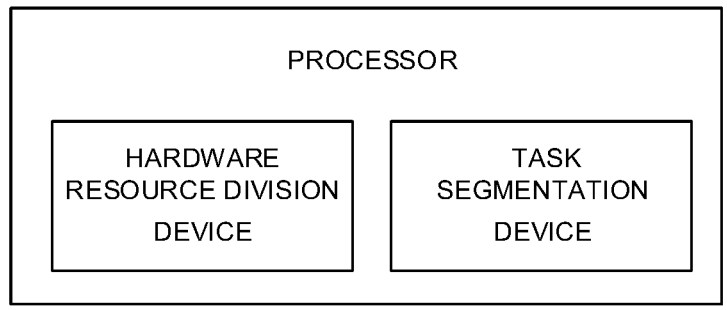
FIG. 1 is a structure block diagram of a processor according to an embodiment of the disclosure.

The disclosure provides a processor. As illustrated in FIG. 1, the processor may include a task segmentation device 100 and a hardware resource division device.

The task segmentation device 100 may be configured to perform task segmentation according to a task segmentation granularity.

The hardware resource division device may be configured to divide hardware resources of the processor according to a task segmentation result.

Figure 2:
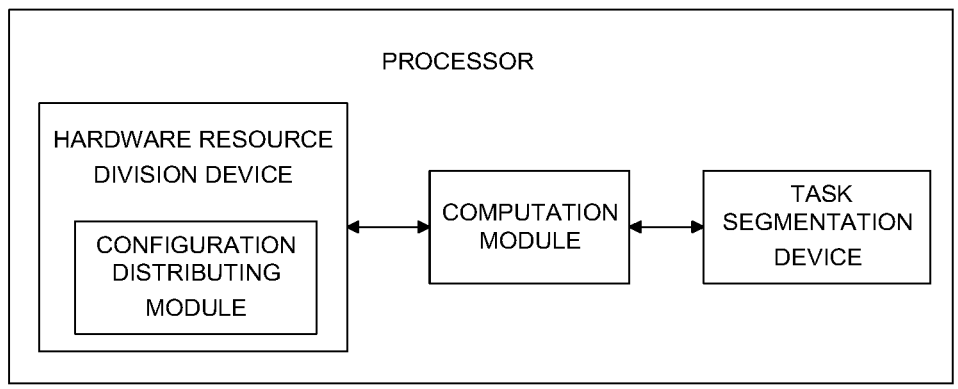
FIG. 2 is a structure block diagram of a processor according to another embodiment of the disclosure.
Figure 3:
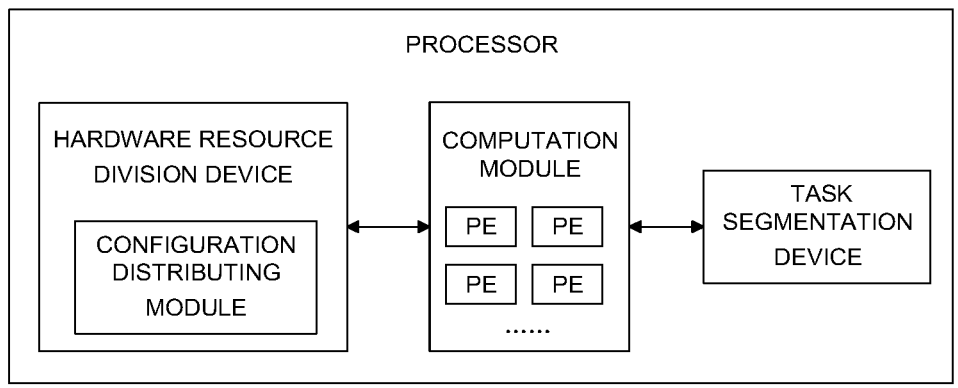
FIG. 3 is a structure block diagram of a processor according to another embodiment of the disclosure.

In an embodiment, as illustrated in FIG. 2-3, the hardware resource division device may include a configuration distributing module configured to distribute configuration information. The configuration information may include configuration information, determined according to the task segmentation result, for division of the hardware resources (at this moment, the corresponding configuration information is determined according to the task segmentation result, and the hardware resources are divided according to the configuration information).

The processor may further include a computation module, in which the computation module may include multiple PEs. The hardware resource division device may be configured to divide the multiple PEs of the processor according to the task segmentation result, for example, dividing the multiple PEs into multiple computation groups according to the task segmentation result, to compute different forward and reverse paths in a batch or run different service requests respectively.

Figure 4:
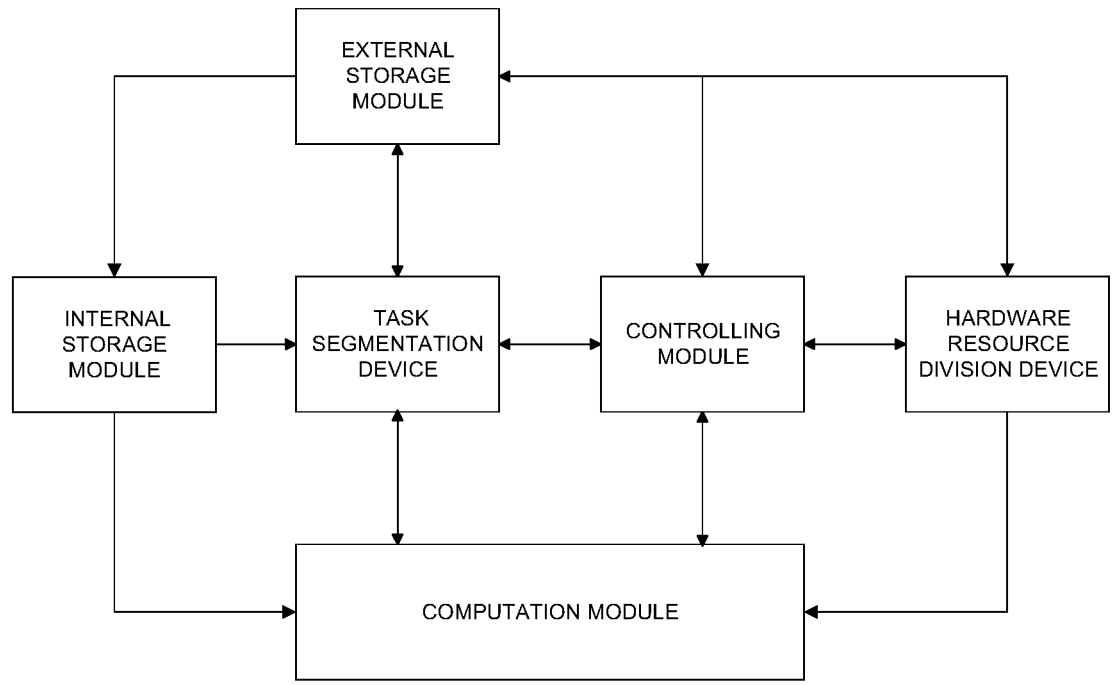
FIG. 4 is a structure block diagram of a processor according to another embodiment of the disclosure.

In an embodiment, as illustrated in FIG. 4, the processor may further include an external storage module, an internal storage module and a controlling module.

The external storage module may be configured to store data information of the computation module, the internal storage module, the controlling module and the configuration distributing module. For example, for neural network computation, the data information may include: weight data, neuron data (including input), instruction data, configuration information and the like.

In addition, the external storage module may provide a read/write interface for an external memory and may configure a related register to flexibly implement operations over different external memories.

The internal storage module may be configured to store data for use by the computation module, including, weights, neurons (including input), instruction data and the like.

The internal storage module may further provide a read/write interface with the external storage module to complete data exchange between the internal storage module and the external storage module.

The controlling module provides an interface for control signal exchange with the external storage module to receive and parse an external control signal, thereby implementing control over the other modules.

The controlling module may further provide a signal exchange interface with the computation module to configure and control the computation module, thereby completing different computation.

The controlling module may further provide a signal exchange interface with the configuration distributing module of the hardware resource division device to send a configuration signal to the configuration distributing module, thereby controlling a function realized by distribution configuration. The controlling module may include a storage unit, and a storage unit may also be configured outside of the controlling module to store different control information.

The controlling module may further provide a signal exchange interface with the task segmentation device 100 to control the task segmentation device 100 to perform task segmentation.

The configuration distributing module may provide a signal exchange interface with the computation module, thereby distributing the configuration information. The configuration information may be configured to configure functions and data connections in the computation module, thereby supporting the computation module to complete batches and multi-service requests. The functions are mainly computation functions of completing a dot product operation, an outer product operation, a nonlinear function operation, a transcendental function operation and the like. Correspondingly, the data connections refers to, for example, the multiple PEs of the computation module are specifically divided into multiple computation groups, according to connection states required by the computation functions and the computation module.

The configuration distributing module may include a storage unit, and a storage unit may also be configured outside of the configuration distributing module to store different configuration information.

The task segmentation device 100 may provide a signal exchange interface with the computation module, thereby performing task division on the computation module. The task segmentation device 100 may divide the tasks on all of the PEs of the computation module and may also selectively divide the tasks on part of the PEs of the computation module.

The computation module may include the multiple PEs.

The multiple PEs may be divided into multiple computation groups to complete different operations. Furthermore, the multiple PEs may be the same PE, in other words an isomorphic mode, and may also be different PEs, in other words a heterogeneous mode.

Specifically, the PEs may structurally be PEs completing simple computation, for example, completing simple operations of scalar multiplication, scalar addition, and scalar multiplication-addition. The PEs may also be PEs completing vector computation, for example, completing operations of vector multiplication, vector addition and vector dot product. The PEs may further be hybrid PEs, for example, matrix PEs configured for operations of matrix multiplication and addition, hybrid PEs configured for vector dot product computation and nonlinear computation, and hybrid PEs including convolutional computation on a pulse array product.

Figure 5:
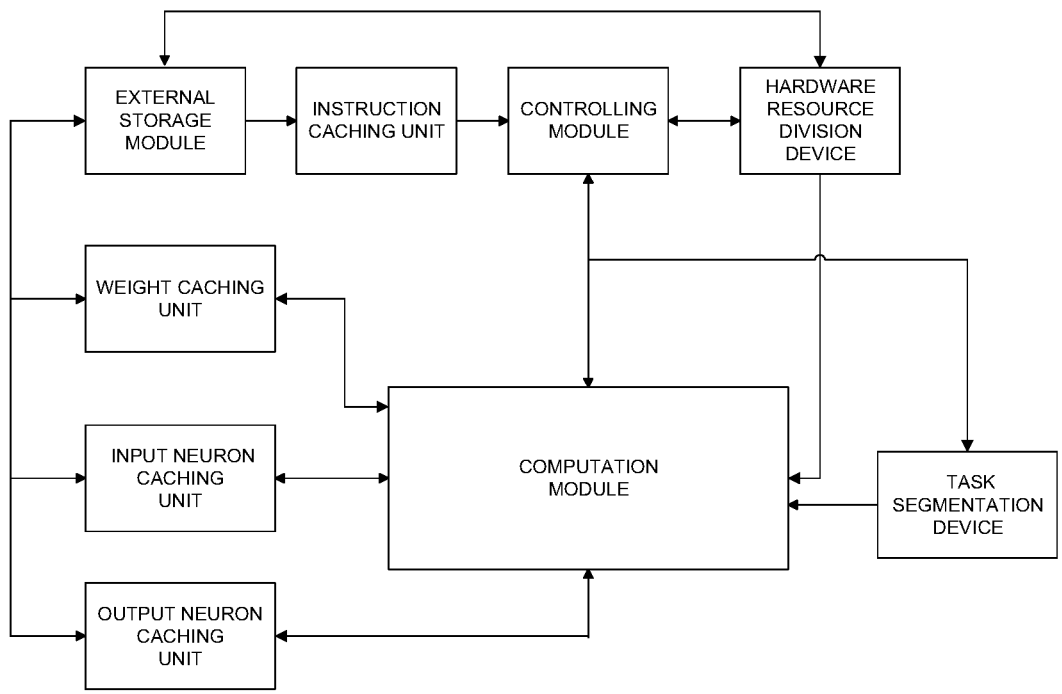
FIG. 5 is a structure block diagram of a processor according to another embodiment of the disclosure.

In an embodiment, as illustrated in FIG. 5, the processor may include the external storage module and the controlling module, and may further include a weight caching unit, an input neuron cache unit, an output neuron caching unit and an instruction caching unit, The instruction caching unit may be configured to cache an instruction.

The weight caching unit may be configured to cache weight data.

The input neuron caching unit may be configured to cache input neuron data.

The output neuron caching unit may be configured to cache a computational result output by the computation module and output it to the external storage module.

Furthermore, the controlling module may be configured to read the instruction from the instruction cache, decode it into an instruction executable for the computation module and output it to the computation module. In the embodiment, the other modules and functions may be the same as the above embodiment and will not be elaborated here.

In the embodiment, input data of the processor may include a picture, a video, an audio, a text and the like. Output data of the device may include numerical data, and its result means, but is not limited to, a classification result and a generation result.

The controlling module of the processor controls the computation module, the hardware resource division device and the task segmentation device 100 according to the control signal. Its control manner may include direct control manner and parsing control manner, where the direct control manner refers to that the control signal is directly input into the other modules and is not required to be parsed by the controlling module; and the parsing control manner refers to that the control signal is required to be parsed in the controlling module to obtain a parsed control signal for input into the other modules for configuration and control.

Figure 6:
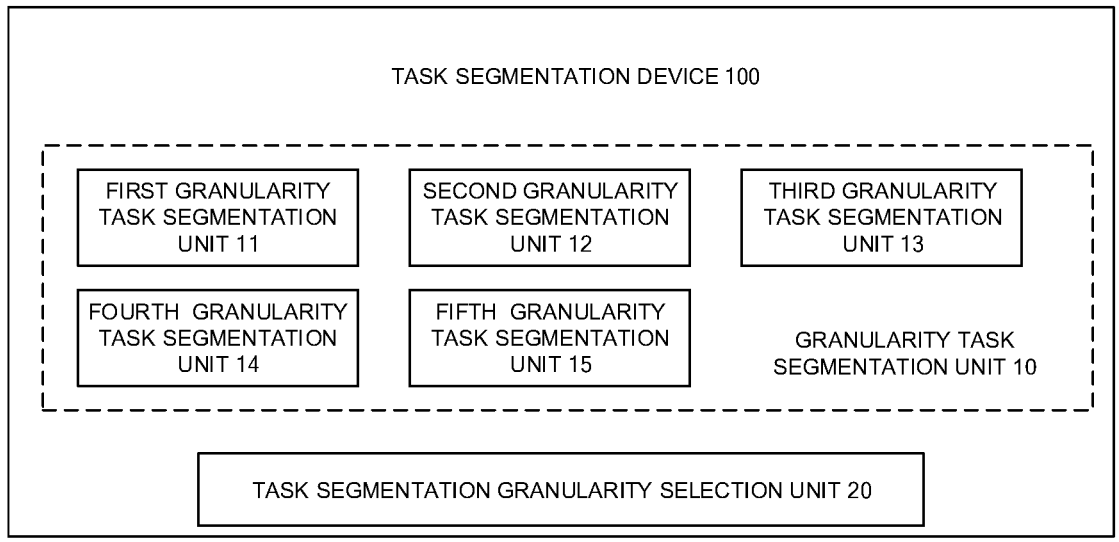
FIG. 6 is a structure block diagram of a task segmentation device according to an embodiment of the disclosure.

In an embodiment, as illustrated in FIG. 6, the task segmentation device 100 may include a granularity task segmentation unit 10 and a task segmentation granularity selection unit 20. The granularity task segmentation unit 10 segments a task by adopting at least one granularity to form subtasks to provide multi-granularity task segmentation selection for a neural network application. The task segmentation granularity selection unit 20 selects the granularity adopted for task division to guide a neural network to select the most suitable task segmentation granularity, to ensure that the subtasks obtained by segmentation may meet system real-time performance.

As illustrated in FIG. 28, the granularity task segmentation unit 10 may include a first granularity task segmentation unit 11, a second granularity task segmentation unit 12, a third granularity task segmentation unit 13, a fourth granularity task segmentation unit 14 and a fifth granularity task segmentation unit 15.

The five granularity task segmentation units will be specifically introduced below. It is assumed that the neural network application is required to complete computation for M samples and a topological structure of the neural network is formed by N layers, where M and N are positive integers greater than 0.

The first granularity task segmentation unit 11 takes the whole task as a subtask, and specifically, completion of computation for the M samples is taken as a subtask. In such a task segmentation manner, only one subtask is generated, and there is no dependency relationship between subtasks.

The second granularity task segmentation unit 12 takes completion of computation for a plurality of samples as a subtask. The neural network is segmented into m subtasks, and the $i^{th}$ task completes computation for Mi samples, where m is a positive integer greater than 1 and less than or equal to M, i=1, 2, 3 . . . m, Mi is a positive integer greater than 0 and less than M and M1+M2+ . . . +Mm=M is met. There is no dependency relationship between the m subtasks obtained in such a task segmentation manner.

The third granularity task segmentation unit 13 may perform task segmentation on the neural network application according to layer types of the neural network, computation for layers of the same type being taken as a task. The layer types of the neural network may include, but are not limited to, a convolutional layer, a fully connected layer, an LSTM layer, a pooling layer, an active layer, an LRN layer and a BN layer. There is a complex dependency relationship between subtasks obtained in such a task segmentation manner.

The fourth granularity task segmentation unit 14 may perform task segmentation on the neural network application according to an interlayer structure of the neural network, in which computation for a plurality of adjacent layers may be taken as a subtask. The neural network application is segmented into n subtasks, a first subtask completes computation for a first layer to $N1^{th}$ layer, total N1 layers, of the neural network, a second subtask completes neural network computation for an $(N1+1)^{th}$ layer to an $(N1+N2)^{th}$ layer, total N2 layers, and an $i^{th}$ subtask completes computation for an $(N1+ \ldots +Ni-1+1)^{th}$ layer to an $(N1+ \ldots +Ni)^{th}$ layer, total Ni layers, wherein n is a positive integer greater than 0 and less than or equal to N, i=1, 2, 3, . . . n, Ni is a positive integer greater than 0 and less than or equal to N and N1+N2+ . . . +Ni+ . . . +Nn=N is met. There is a chain dependency relationship between the subtasks obtained in such a task segmentation manner, where the $i^{th}$ subtask is a precursor task of an $(i+1)^{th}$ subtask, the $(i+1)^{th}$ subtask is a subsequent task of the $i^{th}$ task, and execution of the $(i+1)^{th}$ task may be started only after the $i^{th}$ task is completed.

The fifth granularity task segmentation unit 15 may perform task segmentation on the neural network application according to intra-layer structures of the neural network, and computation in the layers of the neural network may be further segmented into subtasks. Segmentation according to computation in the layers of the neural network may include, but is not limited to, task segmentation on convolutional layer computation, fully connected layer computation, pooling layer computation or active layer computation of the neural network.

Each task segmentation function mentioned above may be realized by adopting an independent hardware unit. For example, the abovementioned functions are realized by adopting a first granularity task segmentation unit 11, a second granularity task segmentation unit 12, a third granularity task segmentation unit 13, a fourth granularity task segmentation unit 14 and a fifth granularity task segmentation unit 15 respectively, and these functions may also be realized by adopting the same hardware unit.

In one case, task segmentation may be performed on the convolutional layer computation of the neural network. Input neurons of the convolutional layer form a three-dimensional matrix (Nfin, Nxin, Nyin). Weights form a four-dimensional matrix (Nfout, Nfin, Kx, Ky), and output neurons form a three-dimensional matrix (Nfout, Nxout, Nyout). Nfin is the count of input feature images. (Nxin, Nyin) is input feature images sizes. Nfout is the count of output feature images. (Kx, Ky) is the size of convolution kernel, and (Nxout, Nyout) is the size of output feature image. Multiplication and addition computation is required to be performed for Nfin×Kx×Ky times for completion of an output neuron, the count of output neurons is Nfout×Nxout×Nyout, and the multiplication and addition computation is required to be performed for total Nfout×Nxout×Nyout×Nfin×Kx×Ky times for completion of the whole convolutional layer. During task segmentation, the output neurons area is segmented according to a block size of (Bfout, Bxout, Byout), and the weights are simultaneously segmented according to a block size of (Bfout, Bfin, Bx, By). Then, each subtask computes intermediate results of Bfout×Bxout×Byout output neurons by use of weights (Bfout, Bfin, Bx, By), the multiplication and addition computation may be performd for Bfin×Bx×By times for the intermediate result of each output neuron, and the multiplication and addition computation is required to be completed for total Bfout×Bxout×Byout×Bfin×Bx×By times, where Bfout is a positive integer greater than 0 and less than or equal to Nfout, Bxout is a positive integer greater than 0 and less than or equal to Nxout, Byout is a positive integer greater than 0 and less than or equal to Nyout, Bfin is a positive integer greater than 0 and less than or equal to Nfin, Bx is a positive integer greater than 0 and less than or equal to Kx and By is a positive integer greater than 0 and less than or equal to Ky. There is no dependency relationship between the subtasks obtained in such a task segmentation manner.

In one case, task segmentation may be performed on the fully connected layer computation of the neural network. The count of input neurons of the fully connected layer is Nin, weights form a two-dimensional matrix (Nout, Nin) and the count of output neurons is Nout. Multiplication and addition computation is required to be performed for Nin times for completion of an output neuron, the count of output neurons is Nout, and the multiplication and addition computation is required to be performed for total Nout×Nin times for completion of the whole fully connected layer. During task segmentation, the output neurons are segmented according to a block size of Bout, and the weights are simultaneously segmented according to a block size of (Bout, Bin). Then, each subtask computes intermediate results of Bout output neurons by use of weights (Bout, Bin), the multiplication and addition computation is required to be performed for Bin times for the intermediate result of each output neuron, and the multiplication and addition computation is required to be completed for total Bout×Bin times, where Bout is a positive integer greater than 0 and less than or equal to Nout, and Bin is a positive integer greater than 0 and less than or equal to Nin. There is no dependency relationship between the subtasks obtained in such a task segmentation manner.

In one case, task segmentation may be performed on the pooling layer computation of the neural network. The count of input neurons of the pooling layer is Nin and the count of output neurons is Nout, where Nin and Nout are positive integers greater than 0. A pooling operation may include, but is not limited to, AVGPOOLING, MAXPOOLING and median pooling. During task segmentation, the output neurons are segmented according to a block size of Bout, and each subtask completes computation for Bout output neurons, where Bout is a positive integer greater than 0 and less than or equal to Nout and Bin is a positive integer greater than 0 and less than or equal to Nin. There is no dependency relationship between the subtasks obtained in such a task segmentation manner.

In one case, task segmentation may be performed on the active layer computation of the neural network. The count of input neurons of the active layer is Nin and the count of output neurons is Nout, where Nin and Nout are positive integers greater than 0. An activation function may include, but is not limited to, sigmoid, tanh, relu and softmax. During task segmentation, the output neurons are segmented according to a block size of Bout, and each subtask completes computation for Bout output neurons, where Bout is a positive integer greater than 0 and less than or equal to Nout. There is no dependency relationship between the subtasks obtained in such a task segmentation manner.

For selecting the granularity adopted for task division, the task segmentation granularity selection unit 20 is not limited to select only one type of the abovementioned granularity, but may also select a combination of multiple granularities. For example, segmentation manners of the fourth granularity task segmentation unit 14 and the fifth granularity task segmentation unit 15 may be combined for a neural network application. The neural network application is segmented into n subtasks at first according to the segmentation manner of the fourth granularity task segmentation unit 14, and then p subtasks therein are segmented according to the segmentation manner of the fifth granularity task segmentation unit 15.

In another embodiment, the granularity task segmentation unit 10 may include at least one of the first to the fifth granularity task segmentation units and not always include all of the first to the fifth granularity task segmentation units.

In another embodiment, the granularity task segmentation unit 10 may further include a hybrid granularity task segmentation unit configured to combine segmentation manners of the first to the fifth granularity task segmentation units for the task segmentation granularity selection unit 20 to select.

Figure 7:
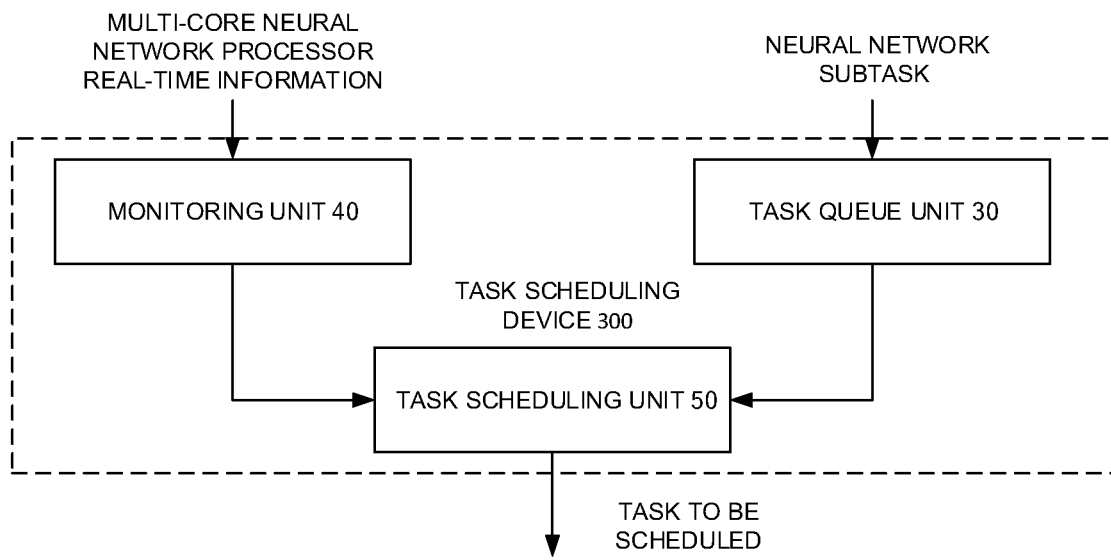
FIG. 7 is a structure block diagram of a task scheduling device according to an embodiment of the disclosure.

In an embodiment, the processor may be a multi-core processor, and may further include a task scheduling device 300. As illustrated in FIG. 7, the task scheduling device 300 may include a task queue unit 30, a monitoring unit 40 and a task scheduling unit 50. The neural network task scheduling device 300 may implement task scheduling in comprehensive consideration of a dependency relationship between tasks, task locality, a task segmentation granularity and running frequencies and loads of cores to improve quality of service, increase utilization rates of the cores, ensure task balance between the cores and reduce energy consumption.

The task queue unit 30 caches all unscheduled neural network tasks and may selectively store execution time of each task to be scheduled, a task dependency relationship diagram and a processing distribution condition of task resources in the cores. The neural network tasks are, for example, the subtasks segmented in the above embodiment.

The monitoring unit 40 detects overall quality of service of the multi-core neural network processor and a working state of each core, for example, a utilization rate, workload, working frequency, the count of tasks in a private task queue in the core and task completion time of each core, in real time.

The task scheduling unit 50 selects a task to be scheduled from the unscheduled tasks, determines a mapping relationship between a task to be unscheduled and a target core according to information about the task to be scheduled and the working state of each core, and allocates the task to be scheduled to a target core.

The task scheduling unit 50 may schedule the unscheduled tasks in the task queues at a time interval T, in which T may be a real number greater than 0. If an unscheduled task t forms a dependency relationship with another task and a precursor task is not completed, the task scheduling unit 50 may not schedule the task t.

The task scheduling unit 50 may select the task to be scheduled from the unscheduled tasks in at least one of the following manners: randomly selecting a task, selecting the task of which estimated execution time is the longest, selecting the task of which the estimated execution time is the shortest, selecting the task occupying the most resources and selecting the task occupying the fewest resources.

The task scheduling unit 50 may allocate and schedule the task to be scheduled to the target core in at least one of the following scheduling manners.

A first scheduling manner is to make statistics on the count of the tasks in the private task queue of each core, select the core with the fewest tasks in the private task queue as the target core and allocate the task to be scheduled to the target core.

A second scheduling manner is to make statistics on the time for completion of all the tasks in the private task queue of each core, select the core of which the task completion time is the shortest as the target core and allocate the task to be scheduled to the target core.

A third scheduling manner is to make statistics on a distribution condition of resources required by the task to be scheduled in all the cores, select the core with the most resources as the target core and allocate the task to be scheduled to the target core.

A fourth scheduling manner is to allocate the task to be scheduled to the target core by adopting a heuristic algorithm, the heuristic algorithm including, but not limited to, a genetic algorithm, an ant colony algorithm and a simulated annealing algorithm.

Figure 8:
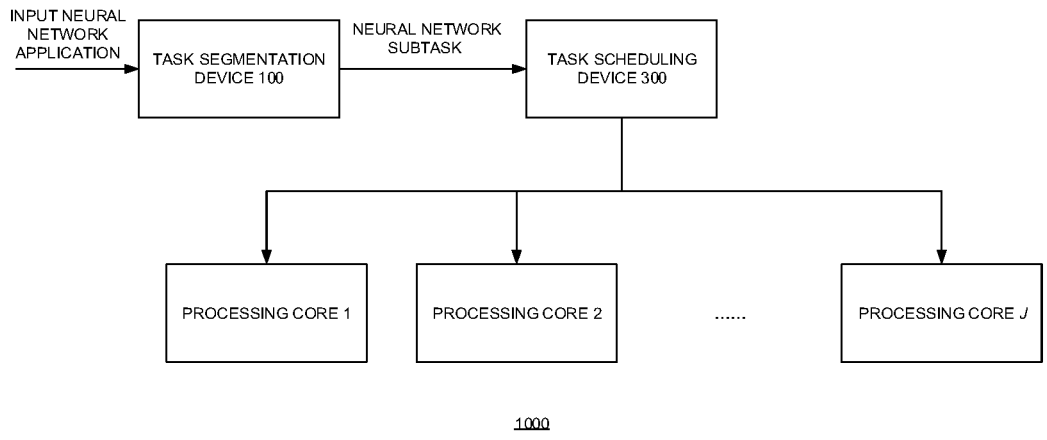
FIG. 8 is a structure block diagram of a multi-core processor according to an embodiment of the disclosure.

In an embodiment, the processor is a multi-core processor 1000, for example, a multi-core neural network processor. As illustrated in FIG. 8, the multi-core neural network processor may include J processing cores (J being a positive integer greater than 1), the task segmentation device 100 and the task scheduling device 300 in the abovementioned embodiments.

The task segmentation device 100 segments an input neural network application in a manner that subtasks obtained by segmentation may meet system real-time performance. The task scheduling device 300 may perform neural network subtask scheduling and may improve the quality of service, increase the utilization rates of the cores, ensure task balance between the processing cores and reduce energy consumption. The neural network processing cores may perform neural network computation to complete the neural network subtasks. A topological structure between the J neural network processing cores may include, but is not limited to, a one-dimensional linear structure, a two-dimensional mesh, a two-dimensional star, a three-dimensional cube and the like.

Figure 9:
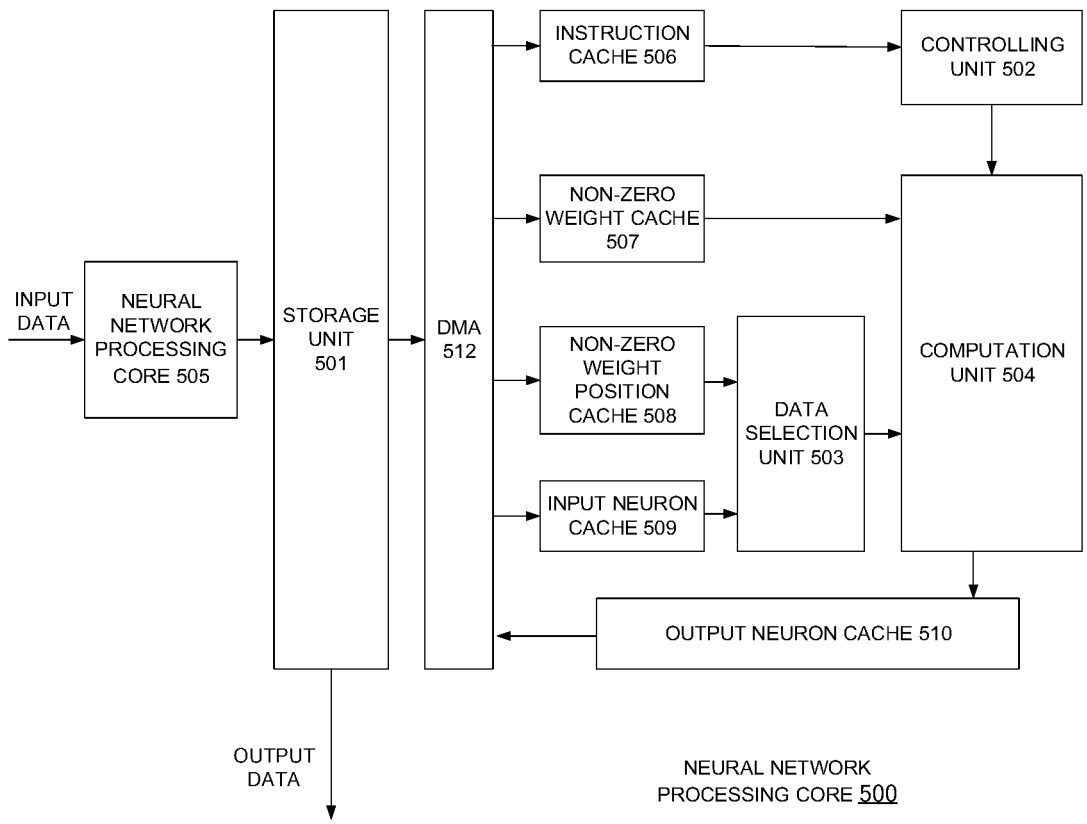
FIG. 9 is a structure block diagram of each neural network processing core for neural network processing according to an embodiment of the disclosure.

In an embodiment, as illustrated in FIG. 9, the neural network processing core 500 may include a storage unit 501, a controlling unit 502, a data selection unit 503 and a computation unit 504.

The storage unit 501 may be configured to store neurons, weights and instructions of the neural network. If a neural network subtask processes a sparse neural network, the stored weights are non-zero weights and non-zero weight position information.

The controlling unit 502 may be configured to receive a neural network dedicated instruction and decode it to generate control information to control the data selection unit and the computation unit 504.

The neural network dedicated instruction may include any instruction dedicated to completion of artificial neural network computation. The neural network dedicated instruction may include, but is not limited to, a control instruction, a data transfer instruction, a computational instruction and a logical instruction. The control instruction controls a neural network execution process. The data transfer instruction completes data transfer between different storage media, and a data format may include, but is not limited to, a matrix format, a vector format and a scalar format. The computational instruction completes an arithmetic computation of the neural network, and may include, but is not limited to, a matrix computational instruction, a vector computational instruction, a scalar computational instruction, a convolutional neural network computational instruction, a fully connected neural network computational instruction, a pooling neural network computational instruction, an RBM neural network computational instruction, an LRN neural network computational instruction, an LCN neural network computational instruction, an LSTM neural network computational instruction, an RNN computational instruction, an RELU neural network computational instruction, a PRELU neural network computational instruction, a SIGMOID neural network computational instruction, a TANH neural network computational instruction and a MAXOUT neural network computational instruction. The logical instruction completes logical computation of the neural network, and may include, but is not limited to, a vector logical computational instruction and a scalar logical computational instruction.

The RBM neural network computational instruction may be configured to implement RBM neural network computation.

The LRN neural network computational instruction may be configured to implement LRN neural network computation.

The LSTM neural network computational instruction may be configured to implement LSTM neural network computation.

The RNN computational instruction may be configured to implement RNN computation.

The RELU neural network computational instruction may be configured to implement RELU neural network computation.

The PRELU neural network computational instruction may be configured to implement PRELU neural network computation.

The SIGMOID neural network computational instruction may be configured to implement sigmoid growth curve (SIGMOID) neural network computation.

The TANH neural network computational instruction may be configured to implement hyperbolic tangent function (TANH) neural network computation.

The MAXOUT neural network computational instruction may be configured to implement MAXOUT neural network computation.

More specifically, the neural network dedicated instruction may include a Cambricon instruction set.

The length of each instruction in the Cambricon instruction set is 64 bit and each instruction consists of an operation code and an operand. The instruction set may include four types of instructions, in other words control instructions, data transfer instructions, computational instructions and logical instructions.

Further, the control instructions may be configured to control an execution process. The control instruction may include a jump instruction and a conditional branch instruction.

Further, the data transfer instructions may be configured to complete data transfer between different storage media. The data transfer instructions may include a load instruction, a store instruction and a move instruction. The load instruction may be configured to load data from a main memory to a cache, the store instruction may be configured to store the data from the cache to the main memory, and the move instruction may be configured to move the data between the cache and another cache or the cache and a register or the register and another register. The data transfer instruction supports three different data organization manners, including the matrix, the vector and the scalar.

Further, the computational instructions may be configured to complete the arithmetic computations of the neural network. The computational instructions may include a matrix computational instruction, a vector computational instruction, and a scalar computational instruction.

Furthermore, the matrix computational instruction completes matrix computation in the neural network, including matrix multiply vector computation, vector multiply matrix computation, matrix multiply scalar computation, outer product computation, matrix add matrix computation, and matrix subtract matrix computation.

Furthermore, the vector computational instruction completes vector computation in the neural network, including vector elementary arithmetic, vector transcendental functions computation, dot product computation, random vector generator computation and maximum/minimum of a vector computation, where the vector elementary arithmetic may include vector addition, subtraction, multiplication and division, and the vector transcendental functions refer to those functions which do not meet any polynomial equations taking polynomials as coefficients, and may include, but are not limited to, an exponential function, a logarithmic function, a trigonometric function and an anti-trigonometric function.

Furthermore, the scalar computational instruction completes scalar computation in the neural network, including scalar elementary arithmetic and scalar transcendental functions computation, where the scalar elementary arithmetic may include scalar addition, subtraction, multiplication and division, and the scalar transcendental functions refer to those functions which do not meet any polynomial equations taking polynomials as coefficients, and may include, but are not limited to, an exponential function, a logarithmic function, a trigonometric function and an anti-trigonometric function.

Further, the logical instructions may be configured for the logical computation of the neural network. The logical instructions may include vector logical computational instructions and scalar logical computational instructions.

Furthermore, the vector logical computational instructions may include vector compare instructions, vector logical operations instructions, and vector greater than merge instructions, where vector compare may include greater than, less than, equal to, greater than or equal to, less than or equal to and unequal to; and the vector logical operations may include AND, OR and NOT.

Furthermore, the scalar logical computational instructions may include scalar compare instructions and scalar logical operations instructions, where scalar compare may include greater than, less than, equal to, greater than or equal to, less than or equal to and unequal to; and the scalar logical operations may include AND, OR and NOT.

The data selection unit may be configured to receive input neurons and the non-zero weight position information, and select neurons corresponding to the non-zero weights. In other words, for each output neuron data, the data selection unit removes input neuron data which have no corresponding non-zero weight data corresponding to the output neuron data.

The computation unit 504 may be configured to receive the neurons corresponding to the input non-zero weights and the corresponding non-zero weights, complete neural network training computation and retransmit the output neurons to a storage part.

Specifically, the computation unit 504 may perform corresponding computation on the data according to the instruction stored in the storage unit 501. The computation unit 504 may include, but is not limited to, three parts, where the first part may include a multiplier, a second part may include one or more adders and a third part may include an activation function unit. Preferably, the one or more adders of the second part form an adder tree. The first part multiplies input data 1 (in1) and input data 2 (in2) to obtain multiplied output (out), and a process is represented with out=in1×in2. The second part adds the input data in1 through the adder tree step by step to obtain output data (out), where in1 is a vector with a length N (N is greater than 1), and a process is represented with out=in1[1]+in1[2]+ . . . +in1[N]; and/or the input data 1 (in1) is accumulated through the adder tree and then is added with the input data 2 (in2) to obtain the output data (out), and a process is represented with out=in1[1]+in1[2]+ . . . +in1[N]+in2; or the input data 1 (in1) and the input data 2 (in2) are added to obtain the output data (out), and a process is represented with out=in1+in2. The third part may perform an activation function computation on the input data (in) to obtain activation output data (out), and a process is represented with out=active(in), where the activation function may be sigmoid, tanh, relu, softmax and the like. Besides an activation operation, the third part may implement another nonlinear function and may perform computation (f) on the input data (in) to obtain the output data (out), and a process is represented with out=f(in).

The computation unit 504 may further include a pooling unit. The pooling unit may perform the pooling computation on the input data (in) to obtain output data (out) pooled, and a process is out=pool(in), where pool is the pooling operation, which may include, but is not limited to: AVGPOOLING, MAXPOOLING and median pooling, and the input data (in) is the data in a pooling core related to the output (out).

The computation unit 504 may perform, but is not limited to, the following computation: the first part multiplies the input data 1 and the input data 2 to obtain multiplied data; the second part may perform adder tree computation to add the input data 1 through the adder tree step by step or add the input data 1 and the input data 2 to obtain the output data; and the third part may perform the activation function computation, performing the activation function computation on the input data to obtain the output data. The computation of the abovementioned parts may be freely combined, thereby implementing computation of various functions.

The neural network processing core 500 may further include a preprocessing module. As illustrated in FIG. 31, the module preprocesses original data, including segmentation, Gaussian filtering, binarization, regularization, normalization and the like.

The neural network processing core 500 may further include an instruction cache 506, a non-zero weight cache 507, a non-zero weight position cache 508, an input neuron cache 509 and an output neuron cache 510. The instruction cache 506 may be configured to store a dedicated instruction. The non-zero weight cache 507 may be configured to cache non-zero weight data. The non-zero weight position cache 508 may be configured to cache non-zero weight position data and, according to the non-zero weight position data, match each weight in input data with the corresponding input neurons one by one. The input neuron cache 509 may be configured to cache the input neurons. The output neuron cache 510 may be configured to cache the output neurons output by the computation unit 504.

The non-zero weight position data indicates whether each input neuron data and each output neuron data have corresponding weight data of non-zero weights or not.

In one case, a method for one-to-one correspondence of cached non-zero weight positions is to adopt 1 to represent existence of a connection and 0 to represent no connection, and form a character string of 0 and 1 by connection states of an output neuron in each group and all the input neurons to represent a connection relationship of the output neuron. In another case, a method for one-to-one correspondence of the cached non-zero weight positions under another condition is to adopt 1 to represent existence of a connection and 0 to represent no connection, and form a character string of 0 and 1 by connection states of an input neuron in each group and all the output neurons to represent a connection relationship of the input neuron. In another case, a method for one-to-one correspondence of the cached non-zero weight positions under another condition is to exhaust a distance between a position of an input neuron corresponding to a first connection of an output neuron in a group and a first input neuron, a distance between an input neuron of the output neuron in a second group and the previous input neuron, a distance between an input neuron of the output neuron in a third group and the previous input neuron, . . . , and so on until all the input neurons of the output neuron are exhausted to represent a connecting relationship of the output neuron.

Existence of the connection refers to that each input neuron data and each output neuron data have corresponding non-zero weight data. No connection refers to whether each input neuron data and each output neuron data have the corresponding non-zero weight data or not.

The neural network processing core 500 may further include a DMA 512.

The DMA 512 may be configured to read/write the data or instruction in the storage unit 501, the instruction cache 506, the non-zero weight cache 507, the non-zero weight position cache 508, the input neuron cache 509 and the output neuron cache 510.

Figure 10:
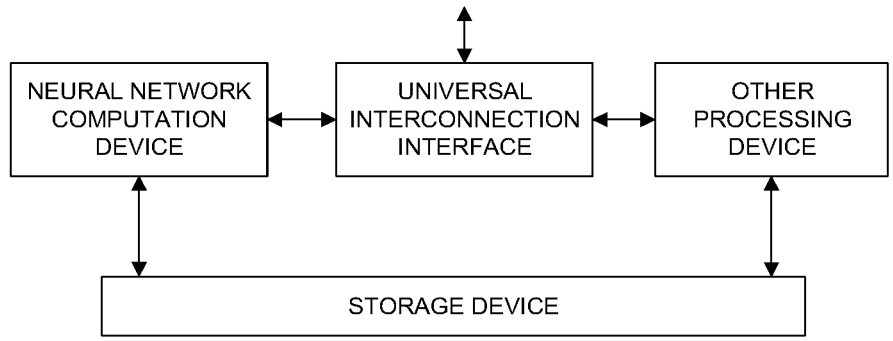
FIG. 10 is a structure block diagram of a combined processing device according to an embodiment of the disclosure.

In an embodiment, the disclosure further provides a combined processing device. As illustrated in FIG. 10, the combined processing device may include a processor, and interacts with other processing device through an interconnection interface to complete a computation operation specified by a user together.

The other processing device may include one or more processor types of universal/dedicated processors such as a CPU, a Graphic Processing Unit (GPU), a neural network processor and the like. The count of the processors included by the other processing device is not limited. The other processing device may serve as an interface between a neural network computation device and external data and control, including data move, to complete basic control such as starting and stopping the neural network computation device. The other processing device may also cooperate with the neural network computation device to complete a computational task together.

The universal interconnection interface may be configured to transmit data and a control instruction between the neural network computation device and the other processing device. The neural network computation device may acquire required input data from the other processing device and write it into an on-chip storage device of the neural network computation device. The neural network computation device may also acquire the control instruction from the other processing device and write it into an on-chip control cache of the neural network computation device. The neural network computation device may also read the data in a storage module of the neural network computation device and transmit it to the other processing device.

The combined processing device may be used as an SoC of equipment such as a mobile phone, a robot, an unmanned aerial vehicle and video monitoring equipment to effectively reduce a core area of a control part, increase a processing speed and reduce overall power consumption. Under this condition, the universal interconnection interface of the combined processing device may be connected with some components of the equipment. The components may include, for example, a webcam, a display, a mouse, a keyboard, a network card and a Wireless Fidelity (WIFI) interface.

Figure 11:
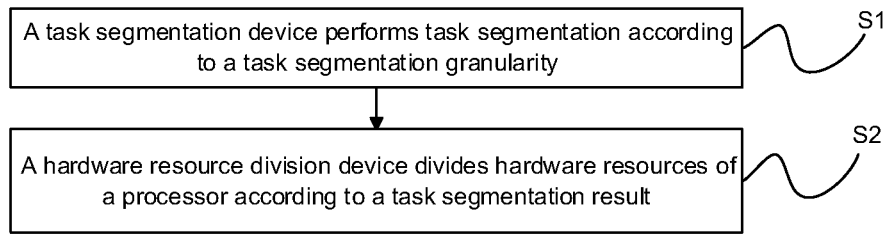
FIG. 11 is a flowchart of a processing method according to an embodiment of the disclosure.

In an embodiment, the disclosure further provides a processing method. As illustrated in FIG. 11, the processing method may include the following steps.

In S1, a task segmentation device 100 may perform task segmentation according to a task segmentation granularity.

In S2, a hardware resource division device divides hardware resources of a processor according to a task segmentation result.

In an embodiment, the hardware resource division device dividing the hardware resources of the processor according to the task segmentation result may include the follows:

Input data and control signal sequences are stored in an external storage module for use.

Data and a control signal are loaded into an internal memory.

A controlling module parses the control signal, and a configuration distributing module parses a distribution configuration signal. For example, in an execution process, the control signal parsed by the controlling module after corresponding configuration information is determined according to the task segmentation result may include an instruction and the configuration information (the configuration information may also be provided in an instruction manner), and if the configuration information is determined, the controlling module sends the configuration information to the configuration distributing module and then the configuration distributing module further sends the configuration information to a computation module. The processor schedules each module to complete corresponding operations according to different signal meanings. For example, if a multi-batch operation may be performed, the processor schedules the configuration distributing module to distribute the configuration information, the computation module to perform computation in groups, and the storage module to send or may receive data. In addition, the configuration information may be sent to the configuration distributing module by the controlling module through the external storage module, and may also be directly sent to the configuration distributing module by the external storage module under control of the controlling module.

A corresponding computation result is output from the computation module to an internal storage module and then is transmitted to the external storage module for subsequent or other use.

If the processor of the disclosure is adopted to perform batch computation on a neural network, a training process and a test process are included, and each forward path in a batch may be parallel performed, where parallel performed computation for each forward path is independent (particularly, weights may be may shared and may also not be may shared). At this moment, the device divides PEs into N independent computation groups to independently compute different forward paths in the batch. In case of the test process, the device may compute an optimal configuration and complete configuration off line, where the optimal configuration may be a configuration about the count of the computation groups, for example, the specific number, capable of achieving an optimal computation effect, of computation units into which multiple PEs in the computation module are divided in a specific computation scenario; and the configuration may also be dynamically regulated to achieve an optimal process in the execution process, where dynamic regulation of the configuration may refer to, for example, that multiple independent computation groups may be configured to compute different output images respectively during execution of a convolutional layer and only one computation group is configured, in other words, all of the PEs may be configured to compute the same layer, during computation for a fully connected layer. In addition, compared with the test process, it is necessary in the training process to reversely compute a gradient and update weights in the network. At this moment, the device may be divided into multiple groups to complete computation of gradients corresponding to different input samples in the batch, and the device may be configured into a group on line, thereby rapidly updating and computing the weights (particularly, the device may also be configured into a group on line to complete computation of the gradients corresponding to different input samples in the batch).

If the processor of the disclosure is adopted to perform a multi-service computation process, a training process and a test process are included, and input and weights required by different service may be different and may also be the same. At this moment, the device is required to be configured into different independent groups to run requests corresponding to different service. Since computation loads corresponding to different service may be totally different, computation resources required corresponding to different service are also different. The device dynamically regulates grouping of the PEs in a running process to meet requirements of multiple pieces of service on quality of service.

Figure 12:
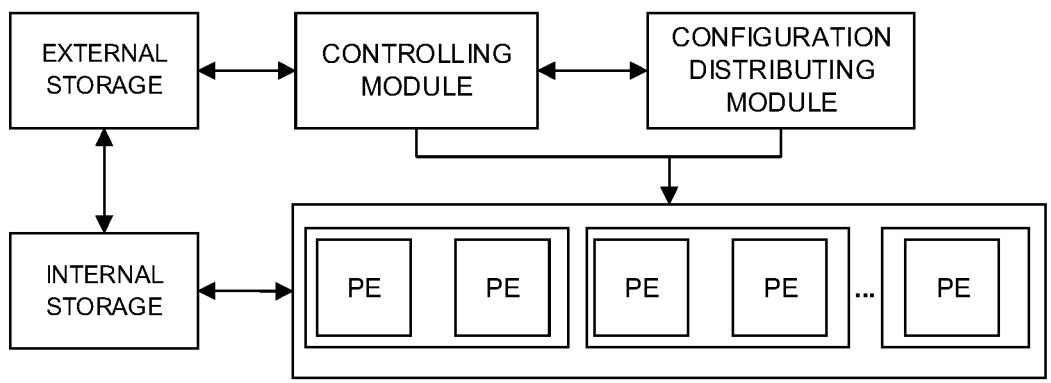
FIG. 12 is a structure diagram after division of PEs according to an embodiment of the disclosure.

In an embodiment, as illustrated in FIG. 12, the PEs in the computation module of the processor are organized in a one-dimensional array, multiple PEs may be configured into different groups and different groups may be configured to compute different input.

How to compute a batch of a convolutional neural network by the processor and corresponding PE configuration of the embodiment will be described below with forward computation for a convolutional layer in the convolutional neural network as an example in detail.

1) Different input of the neural network is input into different computation groups through external storage via the internal storage module, and weights are broadcast to different groups through the external storage via the internal storage module, in other words, different groups adopt different weights data.

2) Different groups start computing respective samples belonging to themselves until forward processes for the samples of the groups are completed.

3) Different groups write their computation results back to internal storage, the results being written back into the external storage or temporally stored in the internal storage for subsequent computation.

4) The processor loads a new batch of input and allocates them to different groups for continuous computation.

Figure 13:
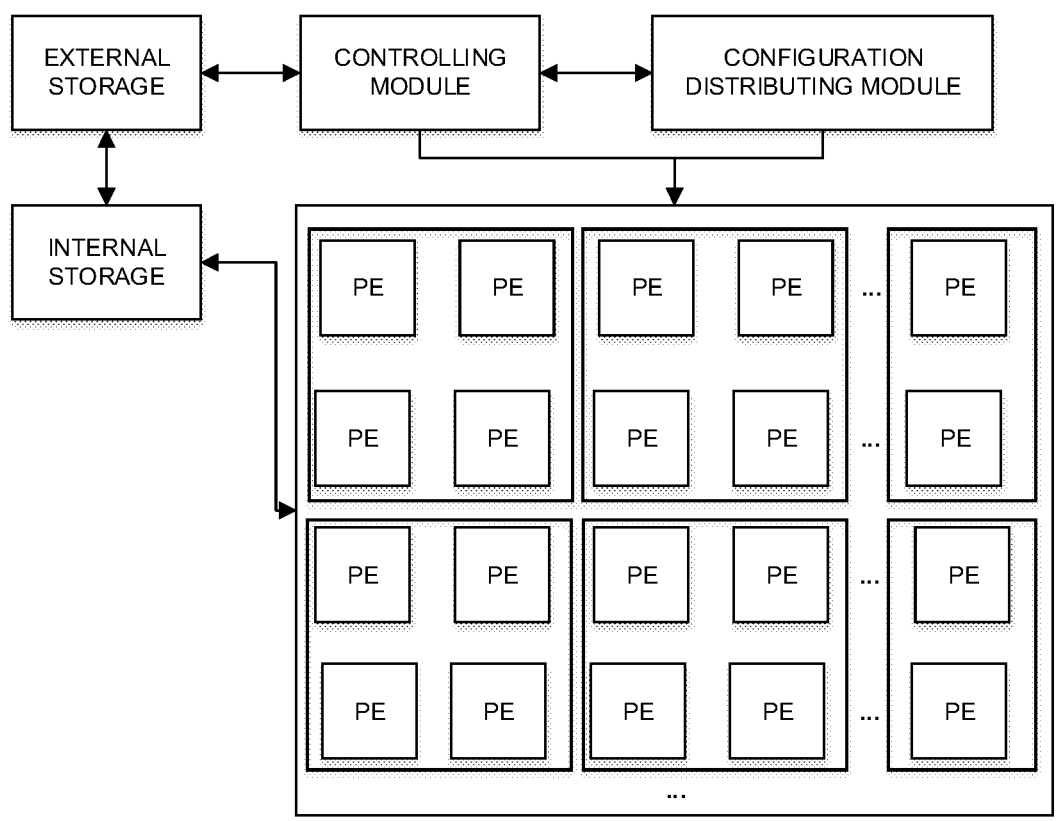
FIG. 13 is a structure diagram after division of PEs according to another embodiment of the disclosure.

In an embodiment, as illustrated in FIG. 13, the PEs are organized in a two-dimensional array, multiple adjacent PEs may be configured into different groups and different groups may be configured to compute different input.

Figure 14:
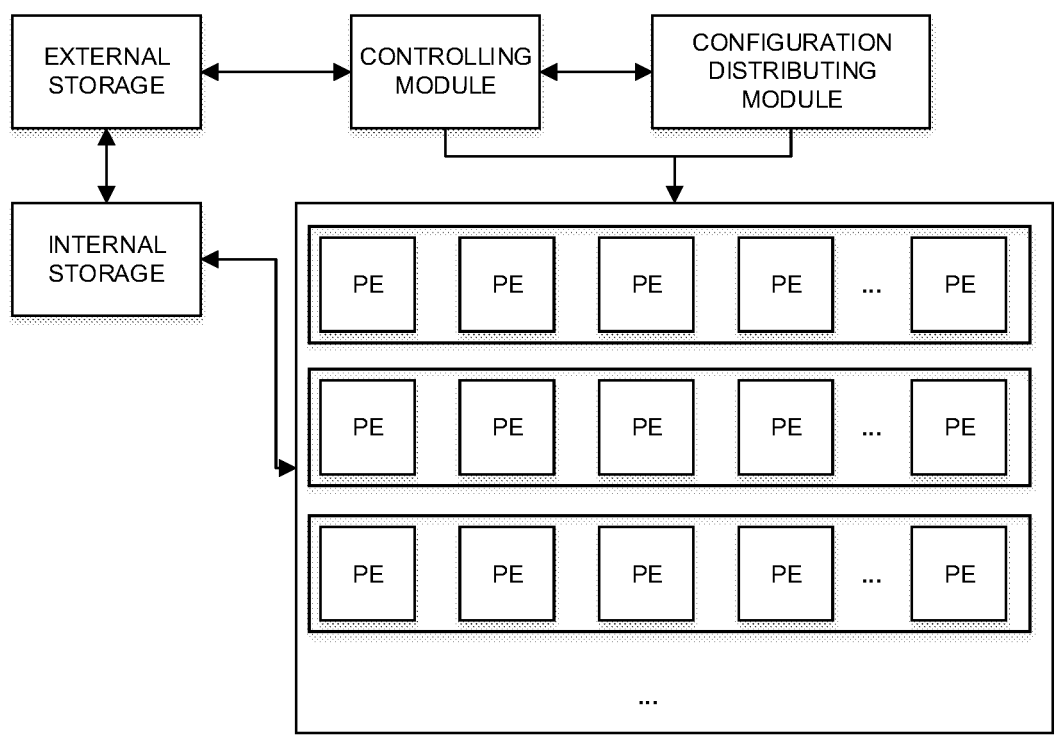
FIG. 14 is a structure diagram after division of PEs according to another embodiment of the disclosure.

In an embodiment, as illustrated in FIG. 14, the PEs are organized in a two-dimensional array, multiple adjacent PEs may be configured into different groups and different groups may be configured to compute different input.

Computation performed by the PEs may include neural network computation.

Specifically, the computation module may include: a multiplier configured to multiply data input into it to obtain multiplied output; and/or one or more adders configured to add input data to obtain output data, where the multiple adders may form an adder tree configured for adder tree computation, for example, adding the input data input step by step to obtain the output data.

More specifically, the computation module may include, but is not limited to: a first part including a multiplier, a second part including an adder tree, a third part including an activation function unit and/or a fourth part including a pooling unit. The first part multiplies input data 1 (in1) and input data 2 (in2) to obtain multiplied output (out), and a process is represented with out=in1×in2. The second part adds the input data 1 (in1) step by step through the adder tree to obtain the output data (out), where in1 is a vector with a length N, N being greater than 1, and a process is represented with out=in1[1]+in1[2]+ . . . +in1[N]; and/or the input data 1 (in1) is accumulated through the adder tree and then is added with the input data 2 (in2) to obtain the output data (out), and a process is represented with out=in1[1]+in1[2]+ . . . +in1[N]+in2; or the input data 1 (in1) and the input data 2 (in2) are added to obtain the output data (out), and a process is represented with out=in1+in2. The third part may perform an activation function computation on the input data (in) to obtain activation output data (out), and a process is represented with out=active(in), and the activation function may be sigmoid, tanh, relu, softmax and the like. Besides an activation operation, the third part may implement another nonlinear function and may perform computation (f) on the input data (in) to obtain the output data (out), and a process is represented with out=f(in). The pooling unit may perform pooling computation on the input data (in) to obtain output data (out) pooled, and a process is out=pool(in), where pool is the pooling operation, which may include, but is not limited to: AVGPOOLING, MAXPOOLING and median pooling, and the input data (in) is data related to the output (out) in a pooling core.

Correspondingly, the operation that the computation module may perform computation may include the follows: the first part multiplies the input data and the input data to obtain multiplied data; and/or the second part may perform adder tree computation to add the input data through the adder tree step by step or add the input data and the input data to obtain the output data; and/or the third part may perform the activation function computation on the input data to obtain the output data; and/or the fourth part may perform the pooling computation, out=pool(in), where pool is the pooling operation, which may include, but is not limited to: avgpooling, maxpooling and median pooling, and the input data (in) is data related to output (out) in a pooling core. The computation of one or more parts of the abovementioned parts may be freely combined in different sequences, thereby implementing computation of various functions.

Computational elements of one or more parts of the abovementioned parts may be freely combined in different sequences, thereby implementing computation of various functions.

In an embodiment, the processing method is used for a neural network. In the step that the task segmentation device 100 may perform task segmentation on each divided hardware resource according to the task segmentation granularity, at least one of the following five granularity task segmentation manners is selected for task segmentation.

In a first granularity task segmentation manner, the whole task is taken as a subtask. Specifically, completion of computation for M samples is taken as a subtask. In such a task segmentation manner, only one subtask is generated, and there is no dependency relationship between subtasks.

In a second granularity task segmentation manner, completion of computation for a plurality of samples is taken as a subtask. The neural network is segmented into m subtasks, and the $i^{th}$ task completes computation for Mi samples, where m is a positive integer greater than 1 and less than or equal to M, i=1, 2, 3, . . . m, Mi is a positive integer greater than 0 and less than M and M1+M2+ . . . +Mm=M is met. There is no dependency relationship between the m subtasks obtained in such a task segmentation manner.

In a third granularity task segmentation manner, task segmentation may be may performed on a neural network application according to layer types of the neural network, computation for layers of the same type being taken as a task. The layer types of the neural network may include, but are not limited to, a convolutional layer, a fully connected layer, an LSTM layer, a pooling layer, an active layer, an LRN layer and a BN layer. There is a complex dependency relationship between subtasks obtained in such a task segmentation manner.

In a fourth granularity task segmentation manner, task segmentation may be may performed on the neural network application according to an interlayer structure of the neural network, computation for a plurality of adjacent layers being taken as a subtask. The neural network application is segmented into n subtasks, a first subtask completes computation for a first layer to $N1^{th}$ layer, total N1 layers, of the neural network, a second subtask completes neural network computation for an $(N1+1)^{th}$ layer to an $(N1+N2)^{th}$ layer, total N2 layers, and an $i^{th}$ subtask completes computation for an $(N1+ \ldots +Ni-1+1)^{th}$ layer to an $(N1+ \ldots +Ni)^{th}$ layer, total Ni layers, where n is a positive integer greater than 0 and less than or equal to N, i=1, 2, 3 . . . n, Ni is a positive integer greater than 0 and less than or equal to N and N1+N2+ . . . +Ni+ . . . +Nn=N is met. There is a chain dependency relationship between the subtasks obtained in such a task segmentation manner, wherein the $i^{th}$ subtask is a precursor task of an $(i+1)^{th}$ subtask, the $(i+1)^{th}$ subtask is a subsequent task of the $i^{th}$ task, and execution of the $(i+1)^{th}$ task may be started only after the $i^{th}$ task is completed.

In a fifth granularity task segmentation manner, task segmentation may be performed on the neural network application according to intra-layer structures of the neural network, and computation in the layers of the neural network may further be segmented into subtasks. Segmentation according to computation in the layers of the neural network may include, but is not limited to, task segmentation on convolutional layer computation, fully connected layer computation, pooling layer computation or active layer computation of the neural network.

In an embodiment, in order to implement task scheduling in comprehensive consideration of a dependency relationship between tasks, task locality, a task segmentation granularity and running frequencies and loads of cores to improve quality of service, increase utilization rates of the cores, ensure task balance between the cores and reduce energy consumption, the processing method may further include that: tasks are allocated and scheduled after task segmentation. Specifically, a task scheduling method may include the follows.

All unscheduled neural network tasks are cached.

Specifically, execution time of each task to be scheduled, the task dependency relationship diagram and the processing distribution condition of task resources in the cores may be selectively stored, and the neural network tasks are, for example, the subtasks segmented in the above embodiment.

Overall quality of service of a multi-core neural network processor and a working state of each core are detected in real time.

Specifically, the working state of each core is, for example, a utilization rate, workload, working frequency, the count of tasks in a private task queue in the core and task completion time of each core.

A task to be scheduled is selected from the unscheduled tasks, a mapping relationship between a task to be scheduled and a target core is determined according to information about the task to be scheduled and the working state of each core, and the task to be scheduled is allocated to a target core.

During task scheduling, the unscheduled tasks in the task queues may be scheduled at a time interval T, T being a real number greater than 0. If an unscheduled task t forms a dependency relationship with another task and a precursor task is not completed, the task t is not scheduled.

A manner for selecting the task to be scheduled from the unscheduled tasks may adopt at least one of the following manners: randomly selecting a task, selecting the task of which estimated execution time is the longest, selecting the task of which the estimated execution time is the shortest, selecting the task occupying the most resources and selecting the task occupying the fewest resources.

The task to be scheduled may be allocated and scheduled to the target core in at least one of the following scheduling manners. A first scheduling manner is to make statistics on the count of the tasks in the private task queue of each core, select the core with the fewest tasks in the private task queue as the target core and allocate the task to be scheduled to the target core.

A second scheduling manner is to make statistics on the time for completion of all the tasks in the private task queue of each core, select the core of which the task completion time is the shortest as the target core and allocate the task to be scheduled to the target core.

A third scheduling manner is to make statistics on a distribution condition of resources required by the task to be scheduled in all the cores, select the core with the most resources as the target core and allocate the task to be scheduled to the target core.

A fourth scheduling manner is to allocate the task to be scheduled to the target core by adopting a heuristic algorithm, the heuristic algorithm including, but not limited to, a genetic algorithm, an ant colony algorithm and a simulated annealing algorithm.

The processes or methods described in the abovementioned drawings may be performed by processing logics including hardware (for example, a circuit and a dedicated logic), firmware and software (for example, software born on a non-transitory computer-readable medium) or a combination of two. Although the processes or methods have been described above according to some sequential operations, it should be understood that some described operations may be performed in different sequences. In addition, some operations may be performed not sequentially but concurrently.

In addition, in some embodiments, signal input of the configuration distributing module may also be direct input by an external signal and a direct control or parsing control manner is adopted.

In some embodiments, a PE organization may be a three-dimensional organization and even a multidimensional organization.

In some embodiments, grouping of the PEs may also be organized in columns, and different grouping manners may also be switched in a running process.

In some embodiments, multiple grouped PEs may also may perform different computational operations corresponding to the same input.

In some embodiments, the PEs may be any PEs from simple PEs to PEs able to realize complex functions.

Those skilled in the art should understand that the processor and processing method of the disclosure may further be applied to image processing and video processing computation and the like, besides neural network computation, where the neural network is also not limited to the convolutional neural network and may also be a fully connected neural network, an RBM neural network, an RNN and the like, and no limits are formed by the convolutional layer and the fully connected layer, as the pooling layer and the like may also be involved.

In some embodiments, a chip is further provided, which may include the abovementioned neural network computation device or combined processing device.

In some embodiments, a chip packaging structure is further provided, which may include the abovementioned chip.

In some embodiments, a board card is further provided, which may include the abovementioned chip packaging structure.

In some embodiments, electronic equipment is further provided, which may include the abovementioned board card.

The electronic equipment may include a data processing device, a robot, a computer, a printer, a scanner, a tablet computer, an intelligent terminal, a mobile phone, an automobile data recorder, a navigator, a sensor, a webcam, a server, a cloud server, a camera, a video camera, a projector, a watch, an earphone, a mobile storage, wearable equipment, a transportation means, a household electrical appliance and/or medical equipment.

The transportation means may include an airplane, a ship and/or a vehicle. The household electrical appliance may include a television, an air conditioner, a microwave oven, a refrigerator, an electric rice cooker, a humidifier, a washing machine, an electric lamp, a gas cooker and a range hood. The medical equipment may include a nuclear magnetic resonance spectrometer, a B-ultrasonic scanner and/or an electrocardiograph.

What is claimed:

1. A processor, comprising
a task segmentation circuit configured to segment a task into multiple subtasks according to a task segmentation granularity; and
a hardware resource division circuit configured to divide hardware resources of the processor respectively for the multiple subtasks,
wherein the task segmentation circuit includes a task segmentation granularity selection circuit configured to determine the task segmentation granularity, and
a granularity task segmentation circuit that includes:
    a first granularity task segmentation circuit configured to take the whole task;
    a second granularity task segmentation circuit configured to:
        divide sample data associated with the task into one or more subset of sample data, and
        identify a computation of each subset of sample data as one of the subtasks;
    a third granularity task segmentation circuit configured to segment the task according to layer types of a neural network, where computation for layers of the same layer type is identified as one of the subtasks;
    a fourth granularity task segmentation circuit configured to segment the task according to an interlayer structure of the neural network, wherein computation for multiple adjacent layers is identified as one of the subtasks; and
    a fifth granularity task segmentation circuit configured to segment the task according to intra-layer structures of the neural network to segment computation types in each of the layers of the neural network into subtasks.

2. The processor of claim 1, further comprising multiple processing elements,
wherein the hardware resource division circuit is configured to divide the multiple processing elements of the processor into multiple computation groups respectively for the multiple subtasks.

3. The processor of claim 2, wherein the hardware resource division circuit is configured to dynamically adjust the multiple computation groups of the processing elements.

4. The processor of claim 1, wherein the task segmentation granularity selection circuit is configured to select at least one of the first to fifth granularity task segmentation circuits for task segmentation on the basis of at least one of the number of samples to be processed of the neural network, a topological structure of the neural network and a computation amount of each layer.

5. The processor of claim 4, further comprising a task scheduling circuit that includes:
    a task queue circuit configured to cache unscheduled tasks;
    a monitoring circuit configured to monitor the working state of each of multiple cores in the processor in real time; and
    a task scheduling circuit configured to select a task to be scheduled from the unscheduled tasks, and allocate and schedule the task to be scheduled to a target core according to the working state of each of the multiple cores.

6. The processor of claim 5, wherein the task scheduling circuit is configured to allocate and schedule the task to be scheduled to the target core in at least one of the following manners:
    counting the number of tasks in a private task queue of each core and selecting the core with the fewest tasks in the private task queue as the target core;
    tracking time for completion of all the tasks in the private task queue of each core and selecting the core of which the task completion time is shortest as the target core;
    monitoring a distribution condition of resources required by the task to be scheduled in all the cores and selecting the core with the most resources as the target core;
    allocating the task to be scheduled to the target core by adopting a heuristic algorithm.

7. A processing method, comprising:
segmenting, by a task segmentation circuit, a task into multiple subtasks according to a task segmentation granularity;
dividing, by a hardware resource division circuit, hardware resources of a processor respectively for the multiple subtasks;
determining, by a task segmentation granularity selection circuit, the task segmentation granularity;
taking, by a first granularity task segmentation circuit of a granularity task segmentation circuit, the whole task;
dividing, by a second granularity task segmentation circuit of the granularity task segmentation circuit, sample data associated with the task into one or more subset of sample data, and
identifying, by the second granularity task segmentation circuit of the granularity task segmentation circuit, a computation of each subset of sample data as one of the subtasks;
segmenting, by a third granularity task segmentation circuit of the granularity task segmentation circuit, the task according to layer types of a neural network, where computation for layers of the same layer type is identified as one of the subtasks;
segmenting, by a fourth granularity task segmentation circuit of the granularity task segmentation circuit, the task according to an interlayer structure of the neural network, wherein computation for multiple adjacent layers is identified as one of the subtasks; and
segmenting, by a fifth granularity task segmentation circuit of the granularity task segmentation circuit, the task according to intra-layer structures of the neural network to segment computation types in each of the layers of the neural network into subtasks.

8. The processing method of claim 7, wherein dividing, by the hardware resource division circuit, the hardware resources of the processor according to the task segmentation result includes:
    dividing, by the hardware resource division circuit, multiple processing elements of the processor into multiple computation groups respectively for the multiple subtasks.

9. The processing method of claim 8, further comprising dynamically adjusting, by the hardware resource division circuit, the multiple computation groups of the processing elements.

10. The processing method of claim 9, further comprising selecting, by the task segmentation granularity selection circuit, at least one of multiple granularity task segmentation circuits based on at least one of an amount of sample data to be processed in a neural network, a topological structure of the neural network, and a computation amount of each layer.

11. The processing method of claim 10, further comprising allocating and scheduling the task after task segmentation, wherein allocating and scheduling the task after the task segmentation includes:

caching unscheduled tasks;

monitoring the working state of each core of the processor in real time; and selecting a task to be scheduled from the unscheduled tasks, and allocating and scheduling the task to be scheduled to a target core according to the working state of each core.

12. The processing method of claim 11, wherein allocating and scheduling the task to be scheduled to the target core includes counting a number of tasks in a private task queue of each core and selecting the core with the fewest tasks in the private task queue as the target core.

13. The processing method of claim 11, wherein allocating and scheduling the task to be scheduled to the target core includes tracking time for completion of all the tasks in the private task queue of each core and selecting the core of which the task completion time is shortest as the target core.

14. The processing method of claim 11, wherein allocating and scheduling the task to be scheduled to the target core includes monitoring a distribution condition of resources required by the task to be scheduled in all the cores and selecting the core with the most resources as the target core.

15. The processing method of claim 11, wherein allocating and scheduling the task to be scheduled to the target core includes allocating the task to be scheduled to the target core by adopting a heuristic algorithm.

* * * * *